(12) United States Patent
Peacock

(10) Patent No.: US 6,381,650 B1
(45) Date of Patent: *Apr. 30, 2002

(54) METHOD FOR FINDING THE ADDRESS OF A WORKSTATION ASSIGNED A DYNAMIC ADDRESS

(75) Inventor: Gavin Murray Peacock, Pleasant Hill, CA (US)

(73) Assignee: Palm, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/814,022

(22) Filed: Mar. 10, 1997

(51) Int. Cl.⁷ .................. G06F 15/16; G06F 15/177
(52) U.S. Cl. ........................... 709/245; 709/228
(58) Field of Search .................. 395/200.1, 200.5, 395/500, 200.53; 370/401, 396, 352, 338; 709/220, 227, 226, 228, 201, 229, 232, 203, 239, 238, 245; 707/3; 713/201; 710/8

(56) References Cited

U.S. PATENT DOCUMENTS

| | | | |
|---|---|---|---|
| 4,245,306 A | * 1/1981 | Besemer et al. ............ 709/245 |
| 4,677,588 A | * 6/1987 | Benjamin et al. ........... 709/228 |
| 4,926,375 A | * 5/1990 | Mercer et al. .............. 709/201 |
| 5,159,592 A | * 10/1992 | Perkins ...................... 370/338 |
| 5,526,489 A | * 6/1996 | Nilakantan et al. ......... 709/228 |
| 5,557,748 A | * 9/1996 | Norris ........................ 709/220 |
| 5,724,510 A | * 3/1998 | Arndt et al. ............. 395/200.5 |
| 5,745,699 A | * 4/1998 | Lynn et al. ............. 395/200.75 |
| 5,790,548 A | * 8/1998 | Sistanizadeh et al. ....... 370/401 |
| 5,812,819 A | * 9/1998 | Rodwin et al. ............. 395/500 |
| 5,815,664 A | * 9/1998 | Asano ........................ 709/227 |
| 5,835,723 A | * 11/1998 | Andrews et al. ............ 709/226 |
| 5,854,901 A | * 12/1998 | Cole et al. ................. 709/245 |
| 5,884,024 A | * 3/1999 | Lim et al. .................. 713/201 |
| 5,968,126 A | * 10/1999 | Ekstrom et al. ............ 709/225 |
| 5,991,828 A | * 11/1999 | Horie et al. .................. 710/8 |
| 6,012,088 A | * 1/2000 | Li et al. .................... 709/219 |
| 6,014,660 A | * 1/2000 | Lim et al. ..................... 707/3 |
| 6,065,061 A | * 5/2000 | Blahut et al. .............. 709/239 |
| 6,101,549 A | * 8/2000 | Baugher et al. ............ 709/238 |
| 6,104,711 A | * 8/2000 | Voit ........................... 370/352 |
| 6,122,669 A | * 9/2000 | Crayford .................... 709/232 |
| 6,173,312 B1 | * 1/2001 | Atarashi et al. ............ 709/203 |
| 6,178,455 B1 | * 1/2001 | Schutte et al. ............. 709/228 |

OTHER PUBLICATIONS

Driscoll et al, Dynamic–IP–hacks Mini–HowTo,http://abel.hive.no/HTML/ldp/mini/Dynamic–IP–Hacks.1996.*
R.Droms, DHCP. RFC1541. www.roxen.com/rfc/rfc1541.htm, Oct. 1993.*

* cited by examiner

*Primary Examiner*—Mark H. Rinehart
*Assistant Examiner*—Thong Vu
(74) *Attorney, Agent, or Firm*—Hickman Palermo Troung & Becker LLP; Van Mahamedi

(57) ABSTRACT

A protocol for locating a server program on a workstation that is dynamically allocated IP address is disclosed. To located a desired server program, a special client program sends out an "Are you there?" message to the last known IP address of the desired server. If the server responds, the client may directly access the server program using the last known IP address. However, if there is no response then the client program sends out a directed broadcast "Are you there?" message to the subnet where the desired server last resided. If the desired server receives the directed broadcast message, the server program responds with the current IP address such that the client program can access the server. If no response is received from the directed broadcast, the client program will send directed broadcast messages to other similar subnets in order to located the server program. Ordinary Domain Name Service is used as a back-up if no response is received.

19 Claims, 8 Drawing Sheets

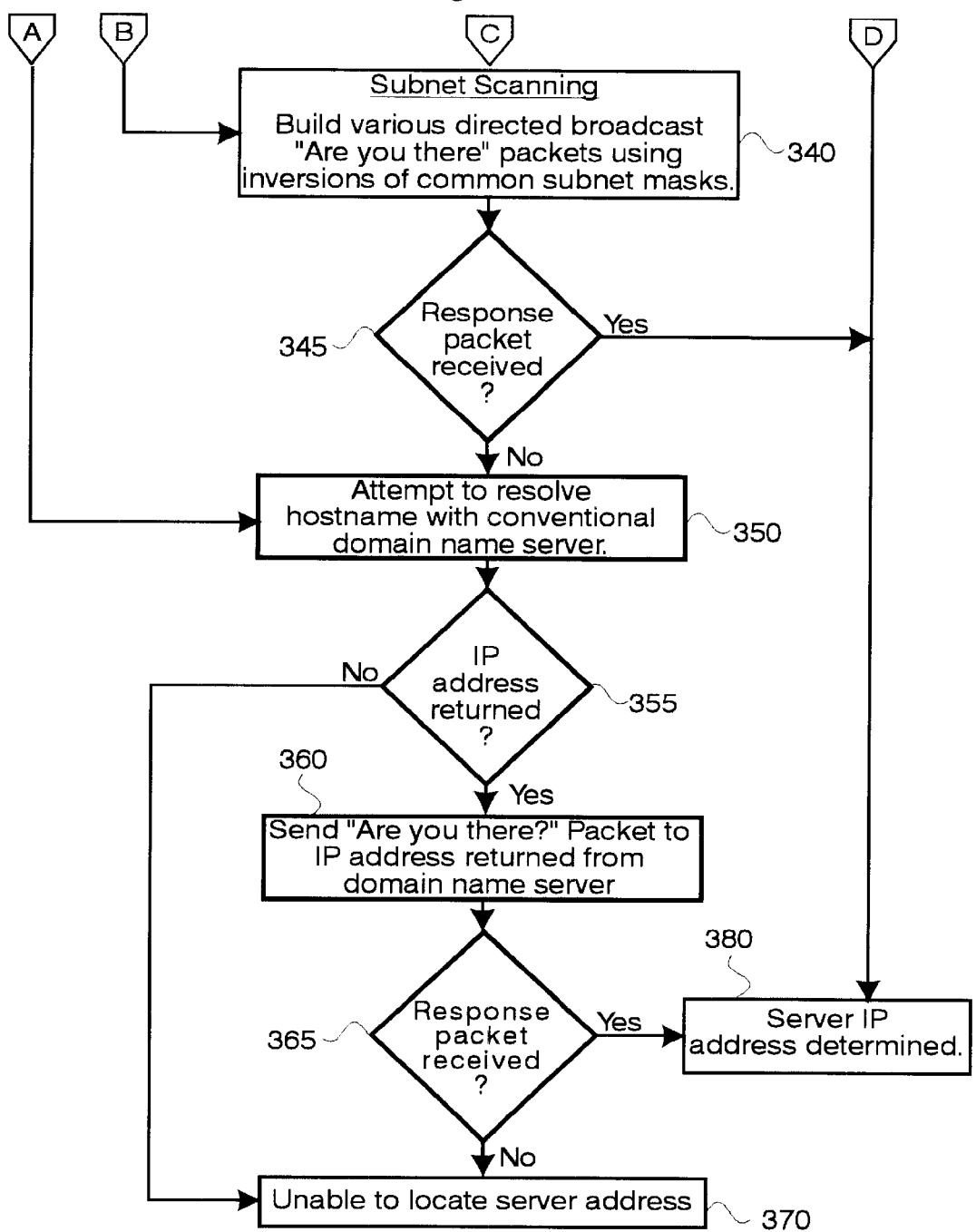

*Figure 5*

| | Network/Subnet | Host | |
|---|---|---|---|
| Subnet Mask | 1 1 1 1...........1 1 1 | 0 0 0......0 0 | 510 |
| Inverted Subnet Mask | 0 0 0 0.........0 0 0 | 1 1 1.........1 1 | 520 |
| IP Address | 1 0 1 1............0 1 | 1 0 1........0 1 | 530 |
| Directed Broadcast Address | 1 0 1 1...........0 0 1 | 1 1 1.........1 1 | 540 |

METHOD FOR FINDING THE ADDRESS OF A WORKSTATION ASSIGNED A DYNAMIC ADDRESS

FIELD OF THE INVENTION

The present invention relates to the field of computer networks. Specifically, the present invention discloses a method of locating a desired service on a workstation that is dynamically assigned an address.

BACKGROUND OF THE INVENTION

A current computer system paradigm is the client-server model. In the client-server model, a server is a program that makes information and/or a service available on a computer network. A client program accesses the information and/or service from the server program across the computer network.

An example of a client-server system is the World-Wide-Web (WWW) on the global Internet. The World-Wide-Web is a set of WWW servers on the global Internet that provide hypertext markup-language (html) documents using the hypertext transport protocol (http). WWW client programs, commonly called WWW browsers, access the html documents from the WWW servers and display the documents in graphical form on a local display.

To identify different computer systems on the global internet, each computer system is given a unique Internet Protocol (IP) address. Each IP address consists of four numbers where each number is less than 256 (four bytes). The four numbers of an internet address are commonly written out separated by periods such as 192.101.0.3

To simplify the addressing of servers on the global Internet, the "Domain Name System" was created. The domain name system allows users to access Internet resources with a more intuitive alphanumeric naming system. An Internet Domain name consists of a series of alphanumeric names separated by periods. For example, the name "drizzle.stanford.edu" is the name for a computer in the physics department at Stanford University. Read from left to right, each name defines a subset of the name to the right. In this example, "drizzle" is the name of a server in the "stanford" domain. Furthermore, "stanford" is a subset of the "edu" domain. When a domain name is used, the computer accesses a "Domain Name Server" to obtain the explicit four byte IP address. The four byte IP address is then used to access the computer system.

There is a finite number of IP addresses available. Due to the explosive growth of the Internet, it has become more difficult to obtain internet addresses. Thus, methods of conserving IP addresses have been introduced. One method of conserving IP addresses is to share a limited pool of IP addresses among a large number of users. This technique is referred to as "dynamic IP address allocation" and the pool of IP addresses are known as "dynamic IP addresses." One embodiment of the dynamic IP address allocation technique is the Dynamic Host Configuration Protocol (DHCP). The dynamic IP address allocation method is often used to allocate IP addresses to individual personal computer workstations that normally act only as clients.

In some situations, the user of a personal computer workstation may wish to make information or a service available to other computers coupled to the network. For example, a user may wish to provide a personal lo web page or provide groupware services. If the user of the personal computer workstation has a dynamically allocated IP address, then it will be difficult to consistently locate the information/service since the IP address will change. Thus, it would be desirable to have a method of consistently locating a server program located on a workstation that receives a dynamically allocated IP address.

SUMMARY AND OBJECTS OF THE INVENTION

It is therefore an object of the present invention to provide a method of locating a server program on a personal computer workstation that receives a dynamically allocated IP address. The method of the present invention operates by using a special server program and a special client program. To located a desired server program, the special client program sends out an "Are you there?" message to the last known IP address of the desired server. If the server responds, the client may directly access the server program using the last known IP address. However, if there is no response then the client program sends out a directed broadcast "Are you there?" message to the subnet where the desired server last resided. If the desired server receives the directed broadcast message, the server program responds with the current IP address such that the client program can access the server. If no response is received from the directed broadcast, the client program will send directed broadcast messages to other similar subnets in order to located the server program. Ordinary Domain Name Service is used as a back-up if no response is received.

BRIEF DESCRIPTION OF THE DRAWINGS

The objects, features, and advantages of the present invention will be apparent from the following detailed description of the preferred embodiment of the invention with references to the following drawings.

FIGS. 3a and 3b illustrate a flow diagram that lists the steps performed by a client program that is attempting to locate a server program on a computer that receives dynamically allocated addresses.

FIG. 5 illustrates how a subnet mask is used to generate a directed broadcast address.

DETAILED DESCRIPTION

Methods and apparatus for locating a computer system that receives a dynamically allocated IP address is disclosed. In the following description, for purposes of explanation, specific nomenclature is set forth to provide a thorough understanding of the present invention. Furthermore, a specific details for one particular embodiment will be disclosed.

However, it will be apparent to one skilled in the art that these specific details are not required to practice the present invention. For example, the present invention an embodiment is disclosed wherein a client computer system wishes to locate a server process on a personal computer in order to synchronize a set of personal information. However, other server processes such as a web server can be implemented. In other instances, well-known circuits and devices are shown in block diagram form to avoid obscuring the present invention.

A Client-Server Network Environment

Figure 1:
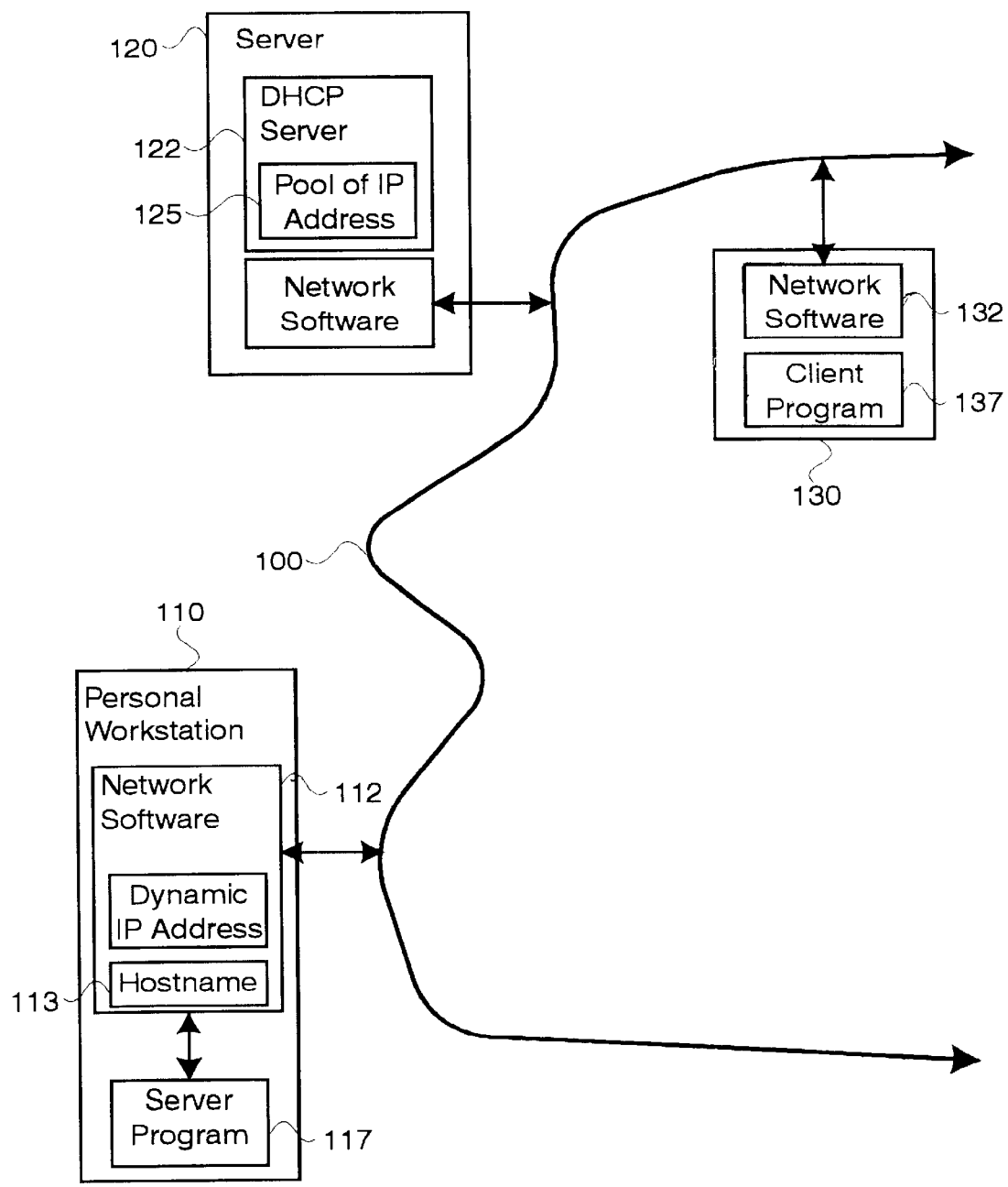
FIG. 1 illustrates a computer network environment including a domain name server, a personal computer workstation with a server program, and a computer system with a client program that access the server program on the workstation.

FIG. 1 illustrates an exemplary client-server computer network environment. In the computer network environment of FIG. 1, there is a personal computer workstation 110 coupled to the computer network 100. The personal computer workstation 110 uses network software 112 to access the computer network 100. The personal computer workstation 110 is given a unique hostname 113.

When internet access is desired, the network software 112 on the personal computer workstation 110 requests a dynamic IP address from a DHCP server program 122 running on a computer server system 120 coupled to the computer network 100. The DHCP server program 122 running on server system 120 allocates a dynamic IP address to the personal computer workstation 110 from the pool of dynamic IP addresses 125. The DHCP server program 122 may lease an IP address to a workstation for a defined period of time. Each time the personal computer workstation 110 requests an IP address, it may receive a different dynamic IP address if the lease of the dynamic IP address has expired.

In the personal computer workstation 110, a server program 117 is executing. The server program 117 may provide information to other computer systems that access the server program 117. For example, client program 137 running on another computer 130 may access the information and services provided by server program 117. In order for the client program 137 to access the server program 117 running on personal computer workstation 110, the client program 137 must have the IP address of the personal computer workstation 110.

If the client program 137 is given the current dynamic IP address of the personal computer workstation 110, then the client program 137 can access the services provided by the server program 117. However, the client program 137 may not be able to access the server program 117 in the future since the dynamic IP address assigned to the personal computer workstation 110 may vary. It would thus be desirable to be able to determine the current dynamic IP address assigned to the personal computer workstation 110 at any point in time.

The present invention introduces a method of determining the IP address of a personal computer workstation that is assigned dynamic IP addresses. The present invention comprises a special client program and special server program. In order for the method of the present invention to operate, the special client program must have certain initialization information about the personal computer workstation.

Obtaining Initial Server Identification Information

In order to locate a server process on a workstation that receives dynamically allocated IP addresses, the client program of the present invention obtains three pieces of server identification information: a unique hostname of the workstation; an initial IP address of the workstation; and a subnet mask for the workstation. At a very minimum, the hostname and initial IP address of the workstation must be obtained. Having the subnet mask will improve the operation of the server locating system, but is not required.

In one embodiment, the server program 117 is a database of personal contact information on the personal computer system 110. The client program 137 is a matching database on a portable computer system 130. To provide the user with current personal contact information while at the workstation 110 or on the road with the portable computer system 130, the client database program 137 and server database program 117 synchronize information. To obtain the initial server identification information, the client program 137 requests the server identification information from the server program 117 during an initial synchronization.

Figure 2:
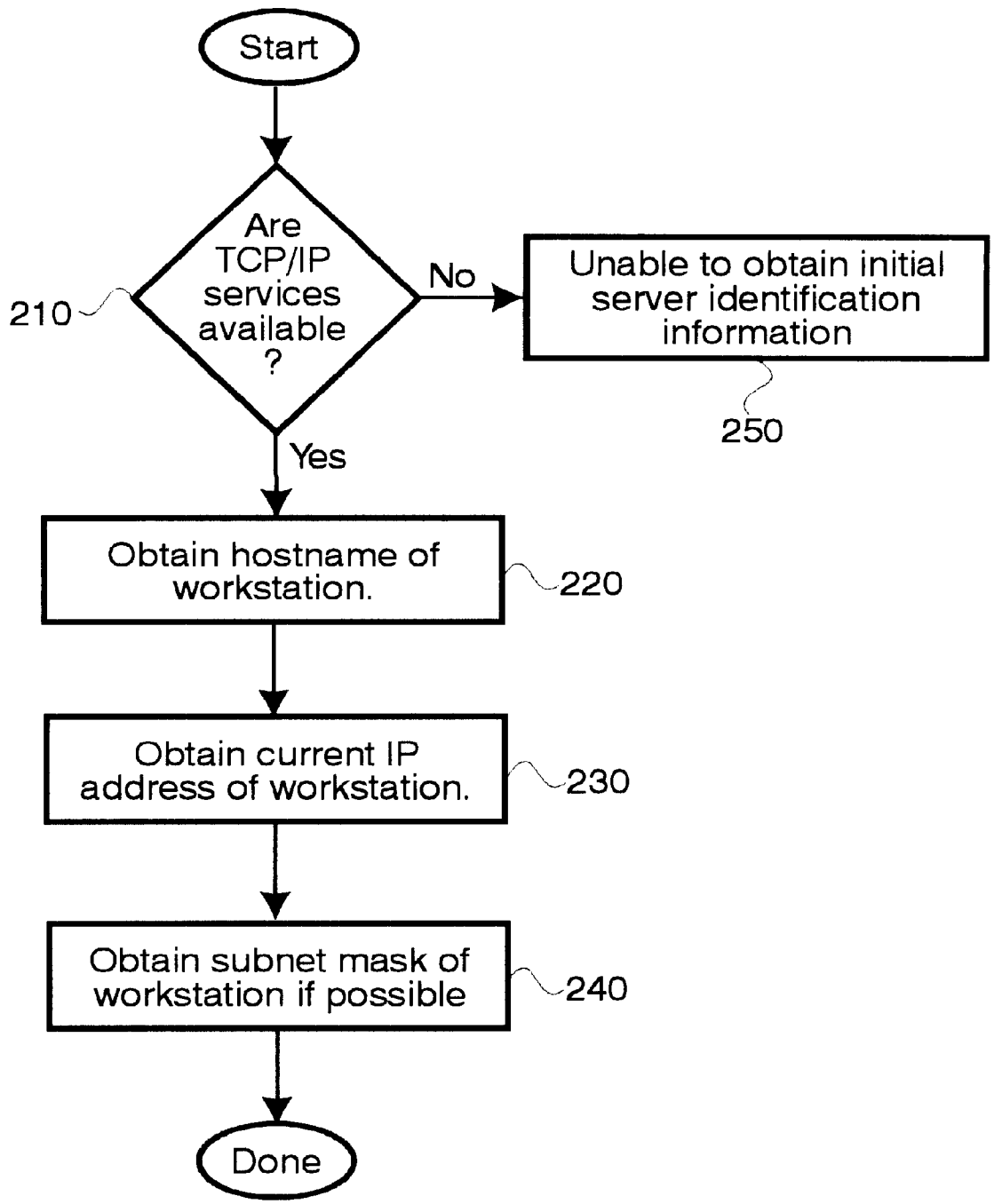
FIG. 2 illustrates a flow diagram that lists the steps performed to obtain the initial server identification information.

FIG. 2 illustrates how the server program 117 obtains the server identification information from the personal computer workstation 110. First at step 210 the server program 117 determines if the personal computer workstation has TCP/IP services available. In a Windows based personal computer system, this can be done by determining if the Winsock Dynamic Link Library (DLL) is available. If the workstation does not have TCP/IP protocol services then the server program gives up at step 250 since the system would not be able to run a server program without TCP/IP services.

If the personal computer workstation has TCP/IP protocol services available, then the server program 117 proceeds to step 220 where the server program 117 obtains a hostname for the personal computer workstation 110. After obtaining a hostname then the server program 117 proceeds to step 230 where the server program 117 determines if the personal computer workstation 110 has been assigned a Internet Protocol (IP) address. If the personal computer has been assigned a IP address then that IP address is stored for future use. In a Windows based personal computer system, the hostname and IP address can be obtained from the Winsock Dynamic Link Library (DLL). Finally, the server program 117 proceeds to step 240 and attempts to obtain a Subnet Mask for the personal computer workstation 110. In one embodiment, a Windows registry is accessed to obtain the subnet mask.

Locating A Server Program On Workstation That Has A Dynamic IP Address

Once a client program 137 has been initialized with the initial server identification information, the client program 137 will then be able to locate the server program 117 on the personal computer workstation 110 even if the IP address of the personal computer workstation 110 is changed. This section will describe how the client program 137 locates the personal computer workstation 110 with reference to the flow diagram in FIGS. 3a, 3b, 4, and 5.

Figure 3A:
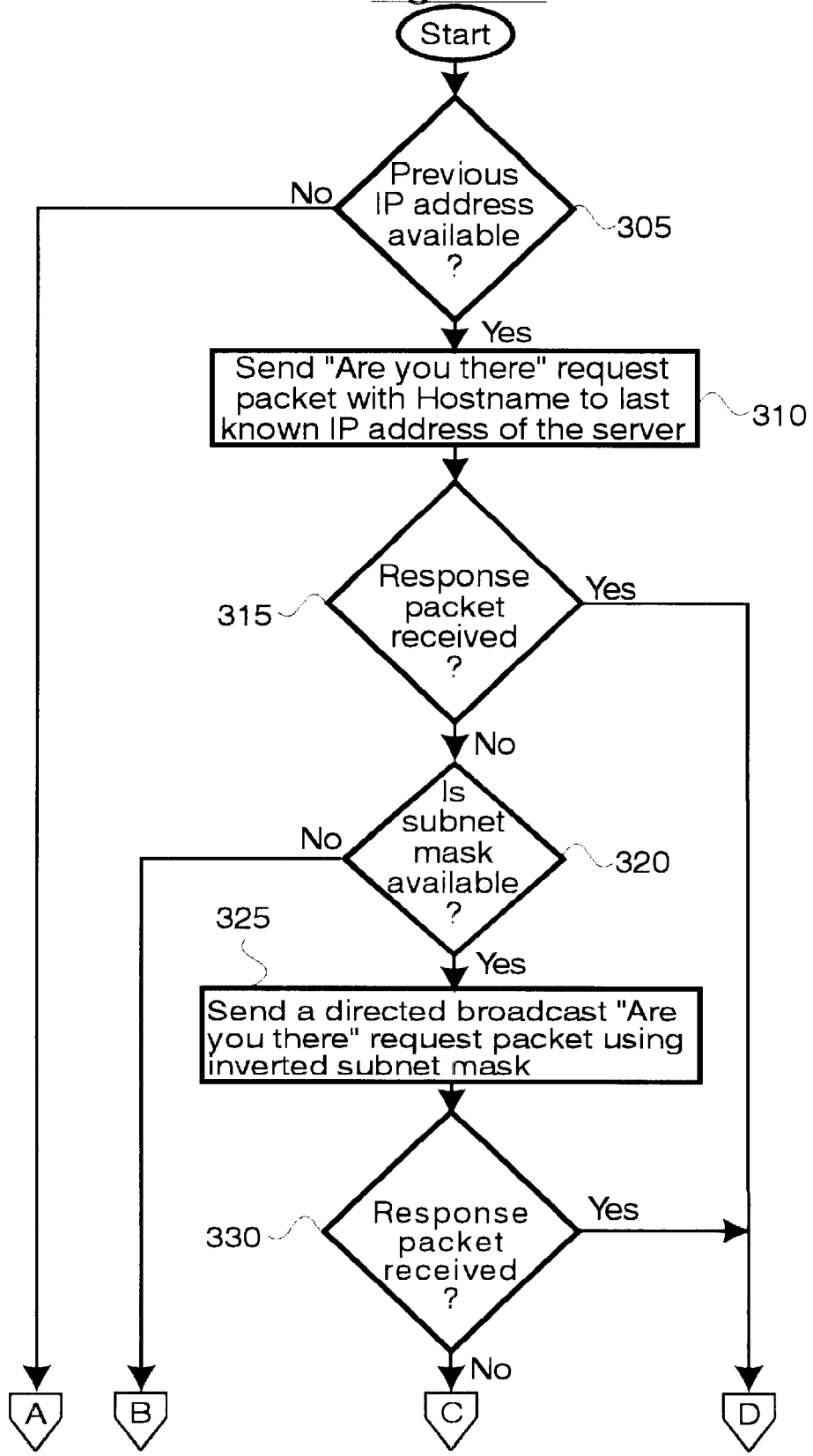

FIGS. 3a and 3b illustrate a flow diagram that describes the steps performed by the client program 137 in order to locate the server program 117 on the personal computer workstation 110. Referring to FIG. 3a, the client program 137 first determines if it has a previously known IP address of the server program 117 at step 305. If a previous IP address is not available, then client program proceeds to step 350 in order to perform a normal domain name service look-up.

Attempt to access the last known IP address

If a previous IP address for the server program 117 is available, the client program 137 sends out an "Are you there?" packet to a reserved port on a system with the previously known IP address at step 310 to see if the server is still located at that address. The "Are you there?" packet includes a hostname, IP address, and subnet mask of the desired server.

Figure 4:
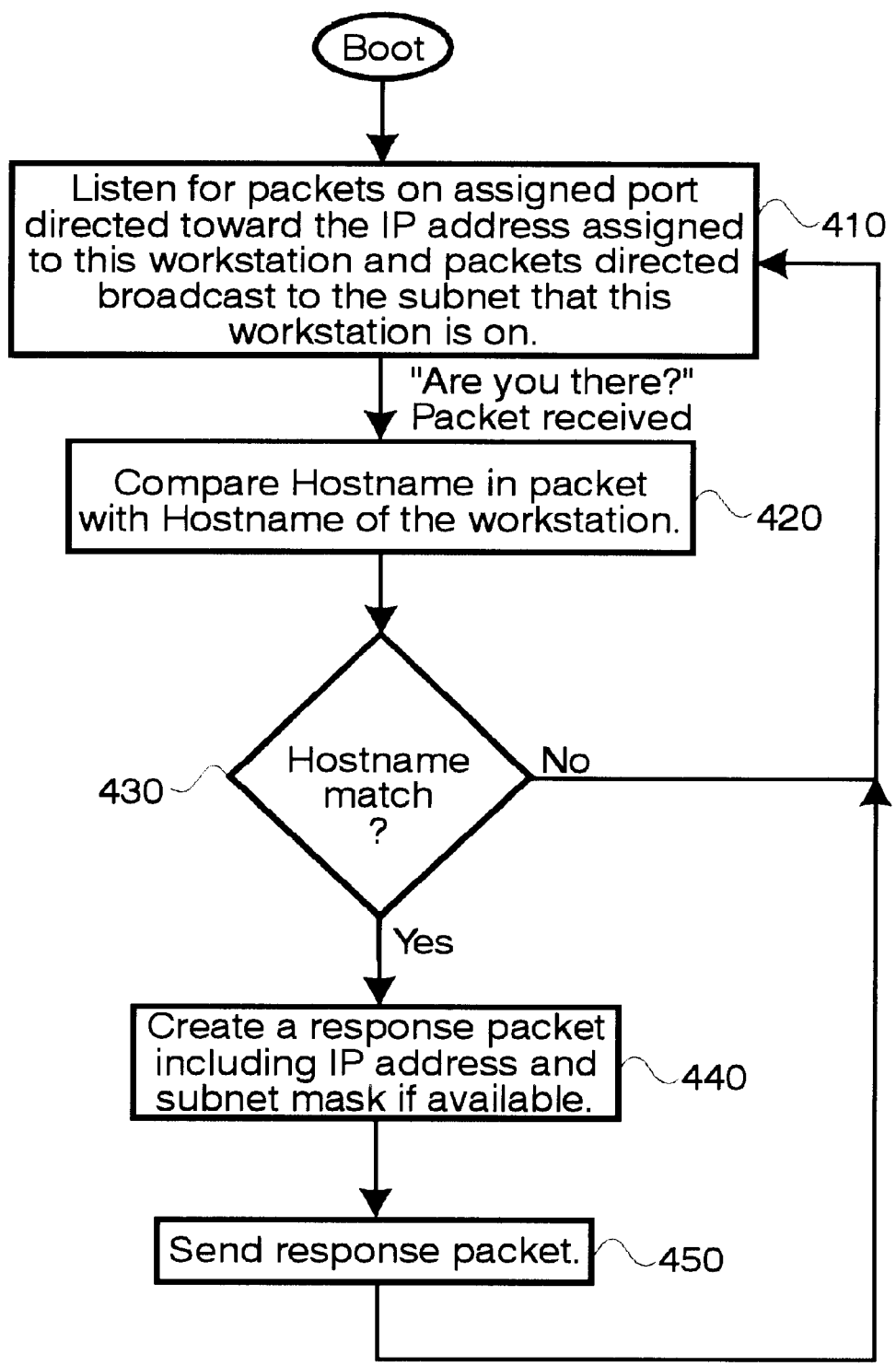
FIG. 4 illustrates a flow diagram that lists the steps performed by a server program that cooperates with the client program described in FIGS. 3a and 3b.

FIG. 4 illustrates a flow diagram of steps performed by a complementary server program on the workstations of the network that implement the present invention. The server program normally remains in step 410 where it waits for packets address for a reserved port. If the server program receives a normal service request packet, the service request packet is handled in a normal manner (not shown). When an "Are you there?" packet arrives on the reserved port, the server program tests if the hostname in the received "Are you there?" packet matches the hostname of the workstation running the server program at step 420. The match comparison is attempted using the hostname both with and without the full domain name. If the hostname from the "Are you there?" packet does not match the hostname of the workstation, then the server program returns to step 410 to listen for more packets. If the hostname matches, the server program creates a response packet at step 440. The server programs stores the hostname, the IP address of the server, and the subnet mask of the workstation into the response packet. The response packet is sent back to the client program that sent the "Are you there?" packet to confirm that the server program has been located.

Referring back FIG. 3a, the client program allows a predetermined amount of time for a response to the "Are you here?" packet at step 315. If the server program is still using the previously known IP address, then the server program will send back the response packet to the client program such that the client program will proceed to step 380. At step 380, the client program can begin using the services offered by the located server program. However, if no response is received after sending an "Are you there?" packet to the previously known IP address, then the client program proceeds to step 320.

At step 320, the client program determines if a subnet mask for the desired server system is known. If no subnet mask is known, the client program proceeds to step 340 to perform "subnet scanning." If the subnet mask for the desired server system is known, the client program proceeds to step 325 to create a directed broadcast.

Subnet-Directed Broadcast using last known IP address and Subnet Mask

At step 325, the client program generates a subnet-directed broadcast "Are you there?" packet that will be sent to all the hosts on subnet where the previously known IP address was on. FIG. 5 illustrates how the subnet-directed broadcast address is created. First, the bits of the subnet mask 510 of the desired server are inverted to generate an inverted subnet mask 520. The inverted subnet mask 520 will have zeros ("0") in the Network/Subnet portion and ones ("1") in the host portion. The inverted subnet mask 520 is then logically ORed with the previously known IP address 530 of the desired server to generate a subnet-dedicated broadcast address 540. The subnet-dedicated broadcast address 540 has the same Network and subnet address as the previously known IP address but all ones ("1") in the host portion. The "Are you there?" packet is usually sent at least twice such that the packet has a better chance of arriving at its destination. (user data gram protocol (UDP) packets do not have guaranteed delivery.)

Referring back to FIG. 3a, after the subnet-directed broadcast message has been sent, the client program listens for response packets at step 330. Again, if a response packet is received then the client program will proceed to step 380 from where the client program can begin using the services offered by the server program. Otherwise, the client program proceeds to the subnet scanning phase at step 340.

Subnet Scanning using last known IP address and Various Subnet Masks

At step 340, the client program begins "subnet scanning." Subnet scanning comprises creating several subnet-directed broadcast "Are you there?" messages by using various commonly used subnet masks. For example, the subnet mask 255.255.255.0 is the subnet mask for a commonly used Internet "Class C" address. The Class C subnet mask would then be used to create a subnet-directed broadcast message using the technique illustrated in FIG. 5. Several different common subnet masks are used. Each "Are you there?" request includes the desired hostname, the previously known IP address, the subnet mask used to generate and the subnet-directed broadcast message.

At step 345, the client program listens for responses to the subnet-directed broadcast "Are you there?" requests sent out during the subnet scanning phase. If a response packet is received, the client program can use the IP address and subnet mask in the response packet to access the server. Thus, if a response packet is received the client program proceeds to step 380 and begins to access the server.

Standard Domain Name Service Fallback

If no response is received after subnet scanning, then the client program proceeds to step 350 to perform standard method of obtaining a server address: domain name service (DNS). At step 350, the client program attempts to resolve the hostname of the desired server with a domain name server. If no IP address is returned, then the client program gives up and states that it could not find the desired server at step 370. If the domain name service resolving returns an IP address, then the client can access the server program on the returned IP address.

In one embodiment, the client may verify the returned IP address as illustrated in FIG. 4. Specifically, the client program sends an "Are you there?" packet to the IP address returned by the DNS resolve at step 360. If a response packet is received, the client program proceeds to use the server at step 380. Otherwise, server program is probably not running on the personal computer workstation and the client gives up at step 370.

Locating a Server that has Moved to Another Network or Subnet

The embodiment described in the previous section is mainly designed to find a server program on a workstation that is receives a dynamic IP address assigned from one particular subnet. Furthermore, the embodiment from the previous section will located a server program that has been moved to a "nearby" subnet. However, the embodiment of the previous section will not be able to locate the server program if the workstation has been moved to new network since only the previous subnet and nearby subnets are polled.

Figure 6A:
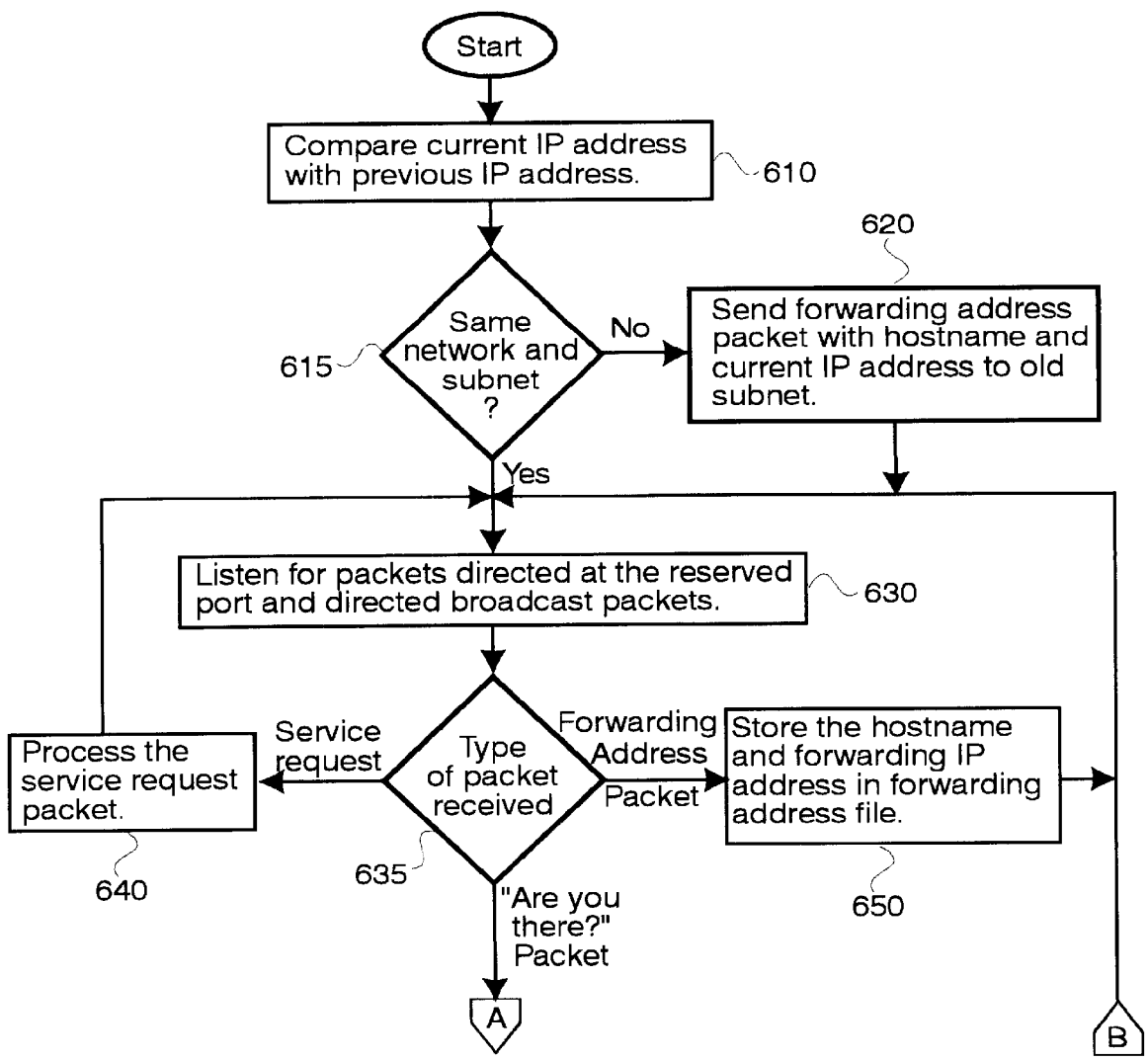
FIG 6a illustrates a first portion of a flow diagram that lists the steps performed by a server program that performs address forwarding.
Figure 6B:
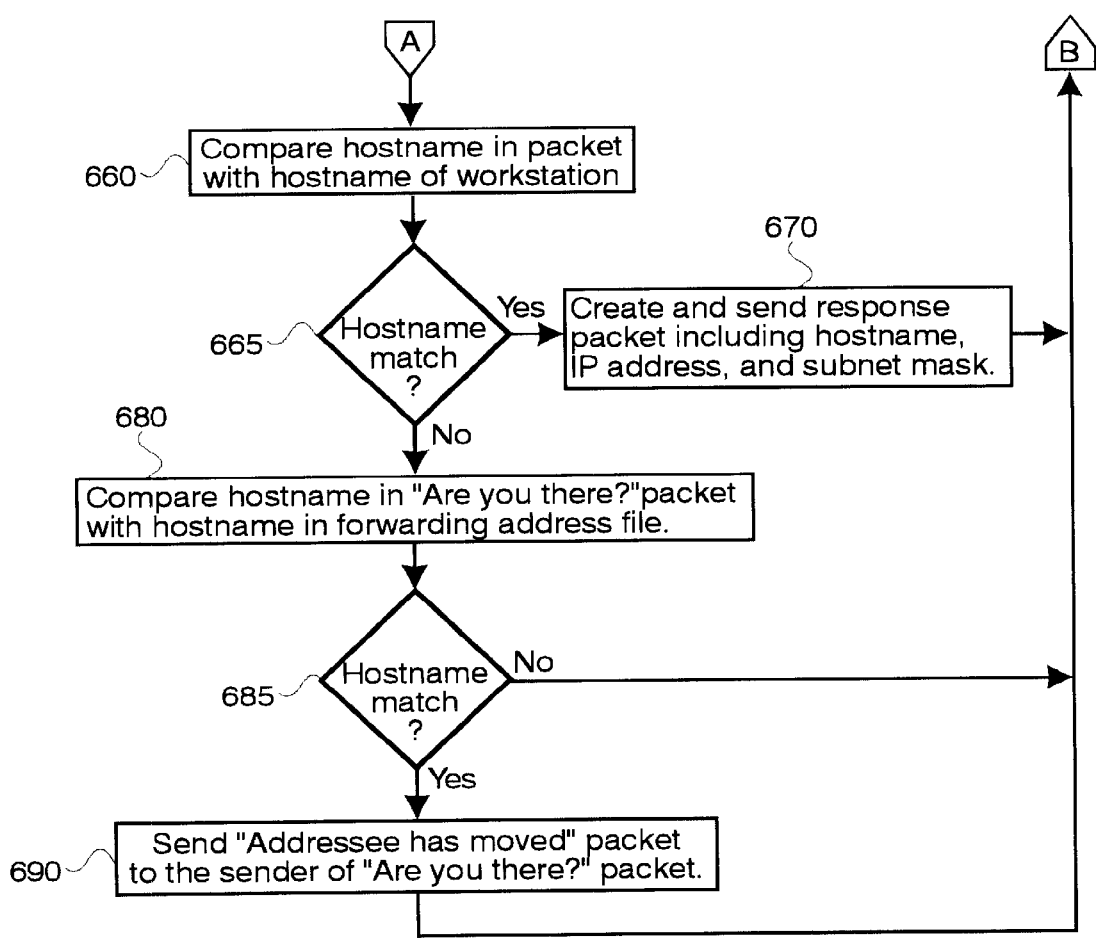
FIG. 6b illustrates a second portion of a flow diagram that lists the steps performed by a server program that performs address forwarding.

To locate a server program on a workstation that has been moved to a completely different network, an address forwarding scheme can be used. FIGS. 6a and 6b illustrates a flow diagram of an alternate embodiment of a server program that performs address forwarding. The changes that would need to be made to the companion client program will also be described.

Referring to FIGS. 6a and 6b when the server program begins, the server program first determines the current IP address of the workstation at step 610. The current IP address is compared against the previous IP address. If the current IP address is from the same network and subnet as the previous IP address, then the server program can proceed to step 630 to begin listening for packets.

If the current IP address is from a different network or subnet than the previous IP address, then the server program sends a directed broadcast "forwarding address" packet to the subnet of the previous IP address at step 620. The forwarding address packet includes the hostname of the workstation that the server program is on and the new IP address of the workstation. After sending out the directed broadcast forwarding address packet, the server program stores the current IP address as the previous IP address. The server program then proceeds to step 630 where it waits for packets.

The server program normally remains in step 630 where it waits for packets addressed to a reserved port. When a packet arrives on the reserved port, the server program determines the type of packet and step 635 directs the control of the server depending on the type of packet received. If the packet is a normal service request packet, the server proceeds to step 640 to perform its service. If the server packet is a forwarding address packet, then the server proceeds to step 650 to store the forwarding address. Finally, if the server receives an "Are you there?" packet, then the server proceeds to step 660 to handle the request.

When the server receives a forwarding address packet, the server stores the hostname of the system that sent the packet and the forwarding IP address of that system into a forwarding address file at step 650. Each hostname/IP address entry in the forwarding address file has an associated timestamp that specifies when the forwarding address was received. When the forwarding address file is full, the oldest hostname/IP address entry will be replaced. If the forwarding address file already has an entry for hostname specified in the forwarding address packet, then the existing entry for that hostname is replaced.

When the server receives an "Are you there?" packet, the server program first compares the hostname in the received packet with the hostname of the workstation running the server program at step 660. If the hostname matches, the server program creates a response packet at step 670. The server programs stores the hostname, the IP address of the server, and the subnet mask of the server into the response packet. The response packet is sent back to the client program that sent the "Are you there?" packet to confirm that the server program has been located.

If the hostname in a received "Are you there?" packet does not match the hostname of the server, then the server program compares the hostname in the "Are you there?" packet with the stored set of hostnames in the forwarding address file at step 680. If the hostname in the packet does not match any of the hostnames stored in the forwarding address file, then the server program then proceeds back to step 630 where the server program waits for another packet. Thus, each server program cooperates with other similar server programs to help find server programs that have moved.

If the hostname from the "Are you there?" packet matches a hostname in the forwarding address file, then the server program prepares a "addressee has moved" packet at step 690. The "addressee has moved" packet contains the hostname of the desired server and the associated forwarding IP address of the desired server. The "addressee has moved" packet is sent back to the sender of the "Are you there?" packet. The server then proceeds back to step 630 where the server program waits for another packet.

When the client program receives an "addressee has moved" packet in response to an "Are you there?" request packet, then client program may access the server program at the forwarding IP address.

In one embodiment, the client program first verifies the forwarding IP address. Specifically, the client program sends an "Are you there?" request packet to the forwarding IP address. If the server program responds, then the client can access the server program at that IP address.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A system or obtaining a current internet protocol (IP) address of a particular computer on a network the particular computer being assigned a current IP address selected from a pool of available IP addresses by a computer server, the system comprising:

a client configured to determine the last known dynamic IP address of the particular network computer, the client being configured to generate and send a subnet broadcast over the network, the subnet broadcast specifying a hostname of the particular network computer, the subnet broadcast being generated from the last known dynamic IP address of the particular network computer;

a plurality of network computers configured to receive the subnet broadcast, each of the plurality of network computers being assigned a corresponding IP address selected from the pool of available IP addresses by the computer server;

each of the plurality of network computers being configured to determine whether their respective hostnames match the hostname specified in the request; and if a first network computer in the plurality of network computers determines that its host name matches the host name in the subnet broadcast, the first network computer sending a response packet to the client so as to be identified as the particular network computer, wherein the response packet includes the current IP address of the particular network computer.

2. The system of claim 1, wherein:

the client is configured so that if a response packet is not received by the client, the client sends a directed broadcast message over the network, the directed broadcast message including a subnet mask such that a directed broadcast address will match any hostname that has a same network address and subnet address as the last known IP address of the particular network; and if the directed broadcast message is received by the particular network computer, the particular network computer being configured to send a response packet to the client including the current dynamic IP address of the particular network computer and a subnet mask of the particular network computer.

3. The system of claim 2, further comprising, if the directed broadcast message is not received by the particular network computer, the client being configured to send a plurality of subnet-directed broadcast messages over the network, wherein each of the subnet-directed broadcast messages includes a respective subnet mask, the hostname of the particular network computer, and the last known IP address of the particular network computer; and if one of the plurality of subnet-directed broadcast message is received by the particular network computer, the particular network computer being configured to send a response packet to the client including the current dynamic IP address of the particular network computer and a subnet mask of the particular network computer.

4. The system of claim 1, further comprising, if the last known IP address of the particular network computer is not determined, the client software program communicating with a domain name server to attempt to determine the last known IP address of the particular network computer.

5. A network system for accessing a particular network computer, wherein the particular network computer is identified by a dynamic internet protocol (IP) address, the system comprising:
- a plurality of network computers coupled to a network, wherein the plurality of network computers comprises the particular network computer, and wherein the particular network computer comprises a server software program;
- at least one client computer coupled to the network and comprising a client software program, wherein the client software program,
  - attempts to determine a last known IP address of the particular network computer; and
  - sends a subnet broadcast over the network, wherein the subnet broadcast specifies a hostname of the particular network computer and is generated using the last known IP address of the particular network computer; and
- wherein the server software program,
  - receives the subnet broadcast and attempts to identify the hostname received as the hostname of the particular network computer; and
  - sends a response packet to the client software program, wherein the response packet includes the current dynamic IP address of the particular network computer and a subnet mask of the particular network computer.

6. The network system of claim 5, further comprising a domain name server coupled to the network, wherein if the last known IP address of the particular network computer is not determined, the client software program communicates with the domain name server to attempt to determine the last known IP address of the particular network computer.

7. The network system of claim 5, wherein the at least one client computer includes a portable computer.

8. An electromagnetic medium containing executable instructions which, when executed in a client computer coupled to a network, cause the client computer to:
- determine a last known IP address of a particular network computer, the particular network computer being coupled to a network using a current dynamic IP address that is unknown to the electromagnetic medium;
- send a subnet broadcast over the network, wherein the subnet broadcast includes a hostname of the particular network computer and the last known IP address of the particular network computer; and
- receive a response packet from the particular network computer, wherein the response packet includes the current dynamic IP address of the particular network computer and a subnet mask of the particular network computer.

9. The electromagnetic medium of claim 8, wherein the instructions, when executed in the client computer coupled to a network, further cause the client computer to, if a response packet is not received, send a directed broadcast message over the network, wherein the directed broadcast message includes a subnet mask such that a directed broadcast address will match any hostname that has a same network address and subnet address as the last known IP address of the particular network.

10. The electromagnetic medium of claim 9, wherein the instructions, when executed in the client computer coupled to a network, further cause the client computer to send a plurality of subnet-directed broadcast messages over the network, wherein each of the subnet-directed broadcast messages includes a respective subnet mask, the hostname of the particular network computer, and the last known IP address of the particular network computer.

11. The electromagnetic medium of claim 10, wherein the instructions, when executed in the client computer coupled to a network, further cause the client computer to, if the last known IP address of the particular network computer is not determined, communicate with a domain name server to attempt to determine the last known IP address of the particular network computer.

12. An electromagnetic medium containing executable instructions of a server program which, when executed in a particular network computer that is coupled to a network, cause the particular network computer to:
- receive a subnet broadcast over the network, wherein the subnet broadcast is sent by a client computer coupled to the network, and wherein the subnet broadcast includes a hostname of a requested network computer and a last known IP address of the particular network computer;
- determine whether a hostname of the particular network computer matches the hostname of the particular network computer; and
- if a match is found, send a response packet to the client computer, wherein the response packet includes a current dynamic IP address of the particular network computer and a subnet mask of the particular network computer.

13. The electromagnetic medium of claim 12, wherein the instructions, when executed, further cause the particular network computer to:
- receive a directed broadcast message from the client computer, wherein the directed broadcast message includes a subnet mask such that a directed broadcast address will match any hostname that has a same network address and subnet address as the last known IP address of the requested network computer; and
- send a response packet to the client computer including the current dynamic IP address of the particular network computer and a subnet mask of the particular network computer.

14. The electromagnetic medium of claim 13, wherein the instructions, when executed, further cause the particular network computer to:
- receive a subnet-directed broadcast message from the client computer, wherein the subnet-directed broadcast message includes a respective subnet mask, the hostname of the particular network computer, and the last known IP address of the requested network computer; and
- send a response packet to the client computer including the current dynamic IP address of the particular network computer and a subnet mask of the particular network computer.

15. A computer implemented method for locating a desired computer on a network from a client, the method comprising:
- identifying a last network address of the desired computer, the last network address being different than a current network address of the desired computer, the current network address being unknown to the client;

creating a subnet-directed broadcast address for a first subnet where the desired computer is located, the subnet-directed broadcast being created using the last network address of the desired computer;

sending a subnet-directed broadcast request message to the subnet-directed broadcast address, the subnet-directed broadcast request message containing a host name of the desired computer;

receiving a response message from the desired computer, the response message including the current address of the desired computer; and accessing the desired computer from the client using the current address.

16. The method of claim 15, wherein:

sending a subnet-directed broadcast request message includes specifying a host name of the desired computer in the subnet-directed broadcast request message.

17. The method of claim 15, wherein creating a subnet-directed broadcast address includes:

inverting a subnet mask of the desired computer system to generate an inverter subnet mask;

logically Oring the inverted subnet mask with the last known address of the desired computer to generate the subnet-directed broadcast address.

18. The method of claim 15, further comprising:

creating a second subnet-directed broadcast address for a second subnet near the first subnet; and sending a subnet-directed broadcast request message to the second subnet-directed broadcast address, the second subnet-directed broadcast request message containing a host name of the desired computer.

19. The method of claim 15, further comprising:

receiving a forwarding address response message in response to the subnet-directed broadcast request message, the forwarding address response message containing a forwarding address of the desired computer; and accessing the desired computer using the forwarding address of the desired computer.

* * * * *